United States Patent Office 2,802,356
Patented Aug. 13, 1957

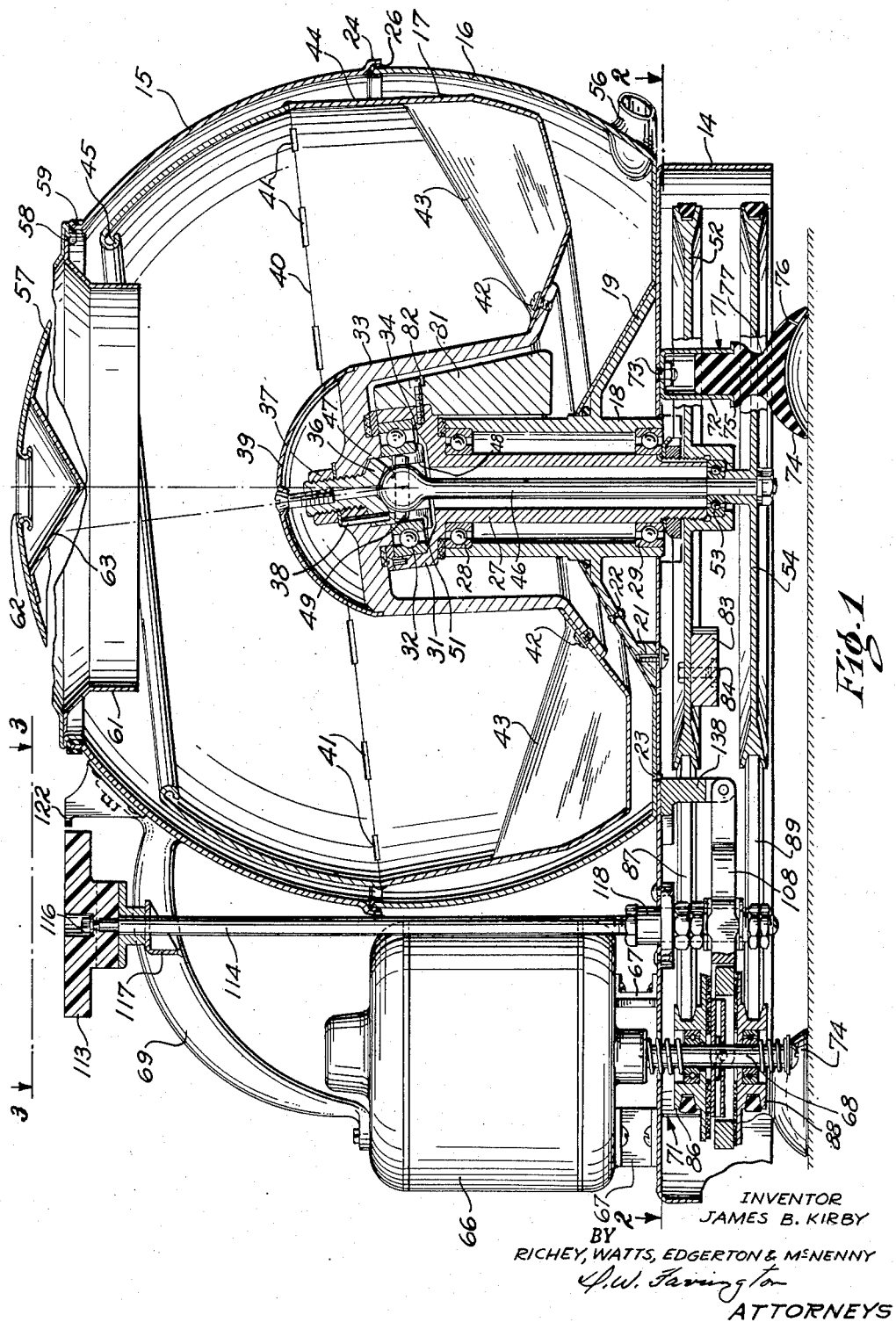

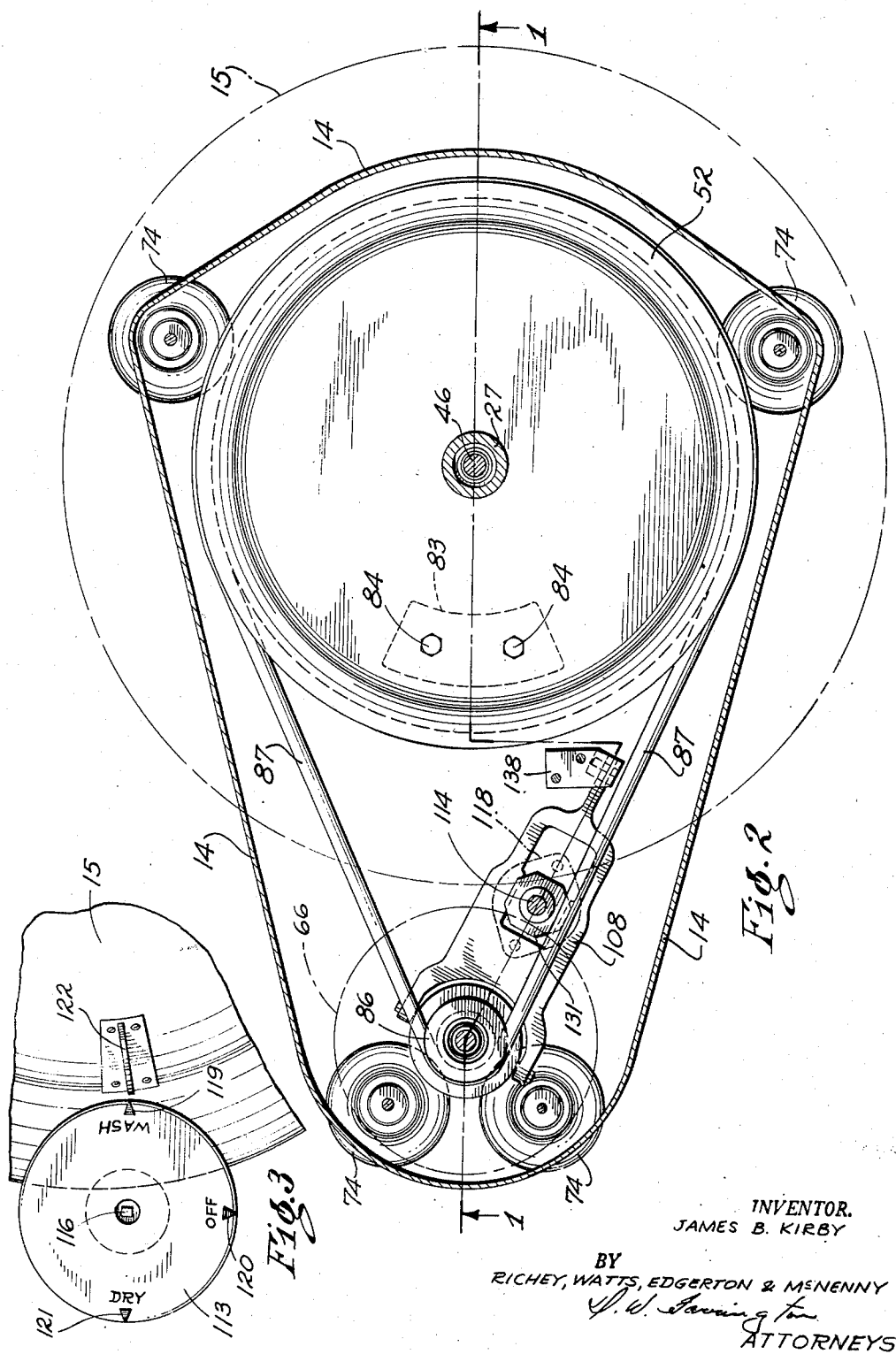

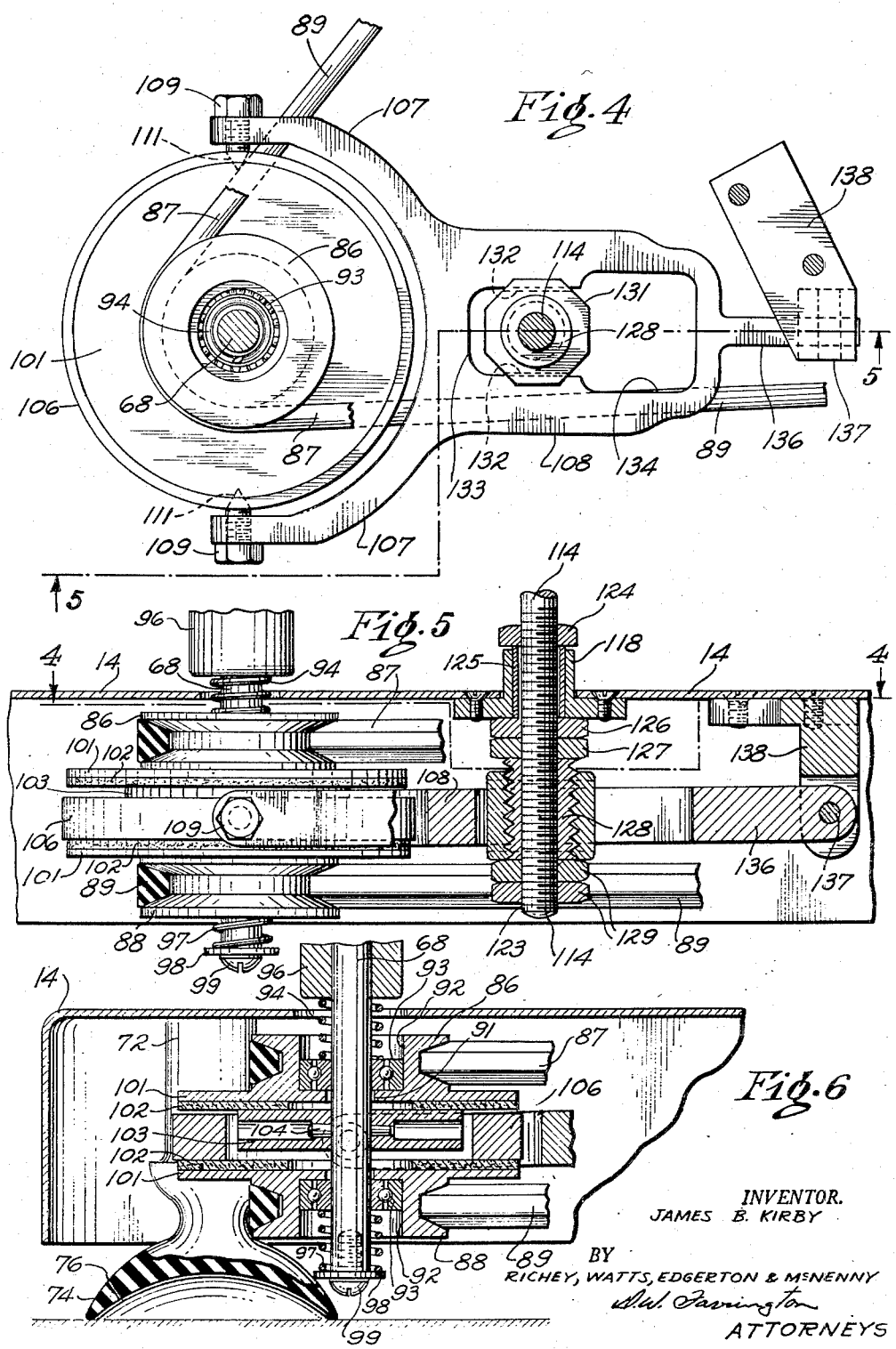

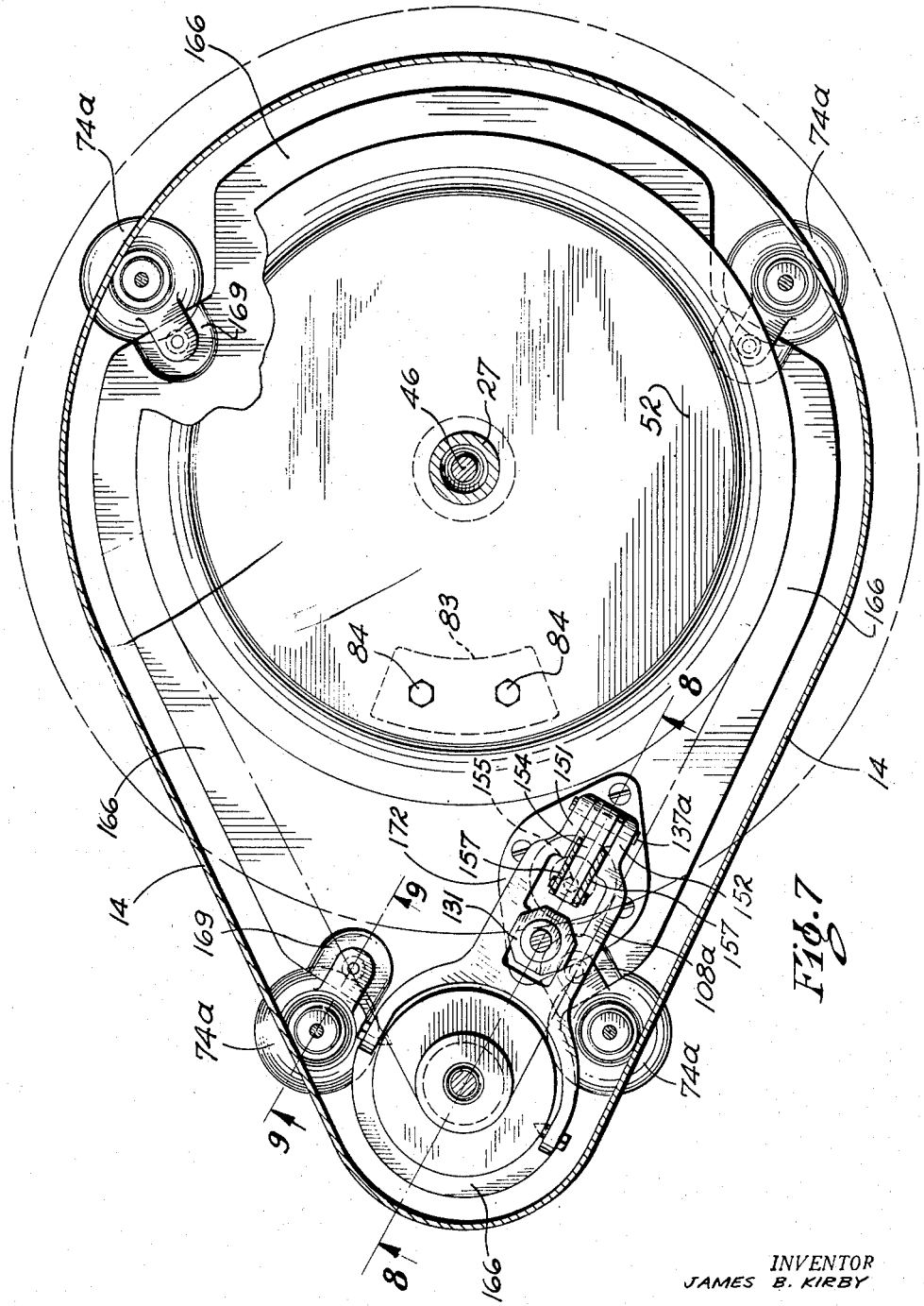

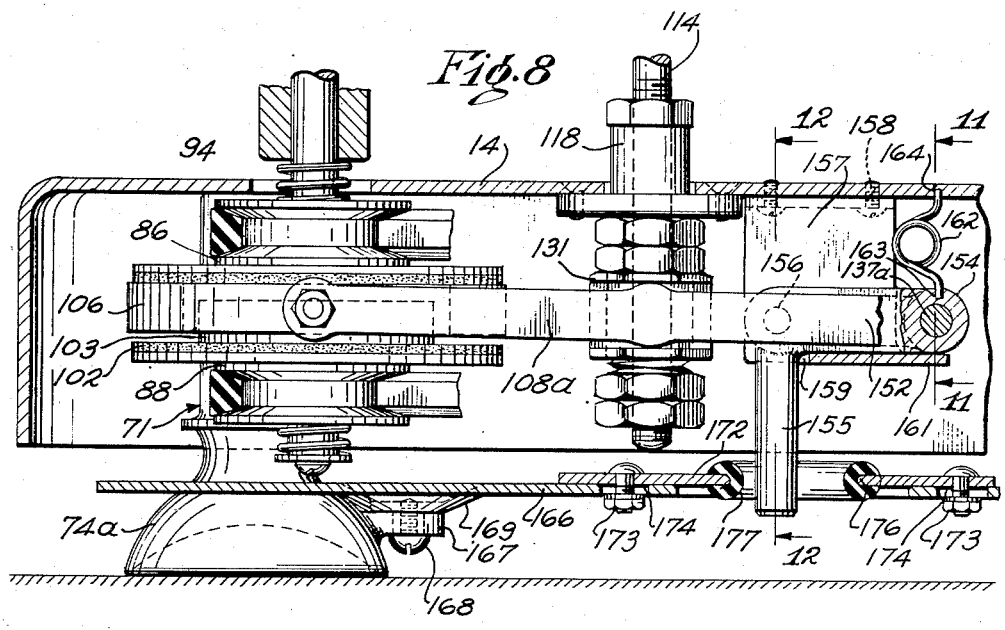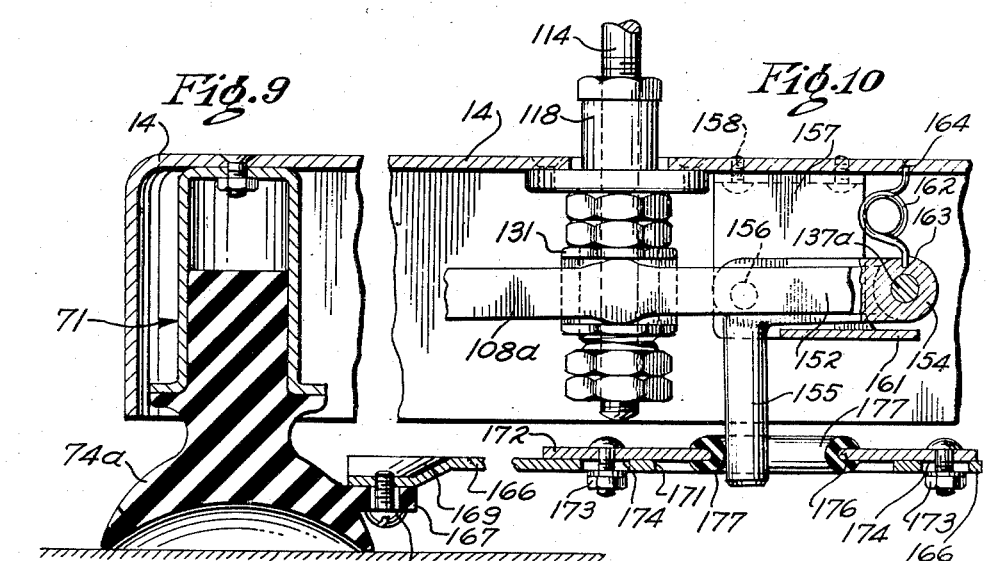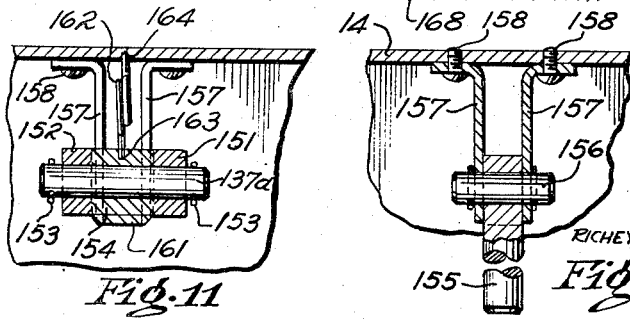

2,802,356

ACCELERATION CONTROL DEVICE FOR CENTRIFUGAL EXTRACTORS

James B. Kirby, West Richfield, Ohio, assignor to The Apex Electrical Manufacturing Co., Cleveland, Ohio, a corporation of Ohio Original application July 12, 1947, Serial No. 760,555, now Patent No. 2,645,917, dated July 21, 1953. Divided and this application December 12, 1952, Serial No. 325,646

5 Claims. (Cl. 68—23)

This invention relates to washing machines and more particularly to a combined washing and extracting machine of the type disclosed and claimed in my co-pending application, Serial No. 760,555 filed July 12, 1947, now Patent No. 2,645,917 dated July 21, 1953, of which the instant application is a division.

This type of machine is characterized by a washing action wherein the container is progressively tilted or wobbled with respect to a vertical axis so that portions of the container are moved with vertical accelerations exceeding the accelerations due to gravity. Such machines are further characterized by centrifugally extracting the water from the clothes by rotating the clothes container so as to discharge the water from the container centrifugally through openings at the maximum diameter of the container.

Numerous attempts have been made to prevent or minimize excessive gyration or excessive vibrations caused by out of balance loads in the container during the centrifugal extraction phase of the machine operation. Some of such prior efforts to solve the problem presented by rotation of out of balance loads include devices responsive to vibration for opening the circuit to the electric motor so that the machine will stop due to excessive out of balance. Other efforts to solve the problems of out of balance provide that a brake would be applied so as to arrest the rotational movement of the spinning extractor.

According to the present invention, the rotational speed of the spinning extractor may be maintained even though out of balance may occur so that water may continue to be extracted from the clothes and such water removal be effective with respect to the out of balance so as to reduce the total out of balance mass. For example, it is generally understood that satisfactory centrifugal extraction for domestic laundry is characterized by a water content equal in weight to the weight of the clothes whereas prior to extraction one pound of clothes may hold as much as four pounds of water. Thus it will be appreciated that one pound of clothes out of balance may hold four pounds of water prior to extraction and thus create a total out of balance of five pounds. Now if such out of balance should operate to shut off the motor or apply a brake as the machine goes into the extracting phase, the source of the out of balance trouble remains and the housewife is required to redistribute the load by hand or manually remove a part of the "water load" carried by the clothes. According to the present invention, namely, by maintaining the rotation a portion of the "water load" is removed by centrifugal extraction and as the "water load" is progressively removed from the clothes which caused the out of balance, the extractor rotational speed may be safely advanced without excessive vibration or gyration of the spinning mass.

It is an object of the present invention to provide a washing machine of the type referred to wherein the supporting structure of the machine includes a part resting on the floor or other supporting surface, which part in turn flexibly supports the container and the drive mechanism and wherein the relative movement between the drive mechanism and the part resting on the floor is utilized to control the rotational speed of the extractor whereby the rotational speed may be maintained within limits determined by the magnitude of the out of balance forces.

It is a further object of my invention to provide a machine according to the preceding object wherein that portion of the supporting structure which is fixed relative to the surface which supports the machine is provided with an opening and that portion of the machine which is moved in response to out of balance loads is provided with a loose fitting pin disposed in the opening so that when the pin is moved with respect to the opening and such relative movement it delays acceleration of the spinning mass.

Other objects and advantages of the invention more or less ancillary in nature will be apparent to those skilled in the art from the description herein of the preferred embodiment of the invention.

Referring to the drawings:

Fig. 1 is a vertical section of a washing machine taken on the plane indicated in Fig. 2;

Fig. 2 is a horizontal section taken on the plane indicated in Fig. 1;

Fig. 3 is a detail view of the control knob taken on the plane indicated in Fig. 1;

Fig. 4 is a partial sectional view illustrating the clutch operating mechanism, taken on the plane indicated in Fig. 5;

Fig. 5 is a partial sectional view illustrating the clutch operating mechanism, taken on the plane indicated in Fig. 4;

Fig. 6 is a partial vertical section, illustrating principally the clutch mechanism;

Fig. 7 is a horizontal sectional view of a machine modified to incorporate a vibration-responsive control for the centrifuge drive;

Figs. 8 and 9 are vertical sections taken on the planes indicated in Fig. 7;

Fig. 10 is a vertical section taken on the same plane as Fig 8, showing the vibration control in operation; and Figs. 11 and 12 are partial vertical sections taken on the planes indicated in Fig. 8.

Referring to Fig. 1, the machine is mounted on a sheet metal base 14 formed with a downwardly directed peripheral flange. The laundering mechanism comprises a generally spherical tub formed in two sections 15 and 16 and an annular basket 17 therein, the tub and basket being supported on a column 18 formed with an integral conical apron 19. The apron is secured to the base by screws 21 entering the apron near its edge, and the bottom of the tub, which fits against the apron and the base, is secured by screws 22 and 23. The upper part 15 of the tub is expanded at its lower edge to form a bead 24 which fits over the bottom portion 16, a sealing ring 26 of rubber or the like being fitted between the two portions.

A hollow shaft 27 extends through the column 18 and is supported by ball bearings 28 and 29. The upper end of the hollow shaft 27 is formed with a head 31 within which is fixed a ball bearing 32, the axis of which is at a small angle, preferably about seven degrees, to the axis of the shaft. A basket hub 33 in the form of an inverted flanged cup is rotatably supported by the inner race of the ball bearing 32 which is clamped between the inner surface of the hub and the flange 34 of a universal joint member 36. The member 36 is threaded into the base of the hub 33 and retained by a jam nut 37 and a pin 38. The hub 33 may thus rotate about the slightly inclined axis. A hub cap 39 retained by a screw covers the hub.

The basket 17 is formed of an upper and a lower section welded together along the line 40. The peripheries of the two portions which are welded are notched slightly, the notches being opposed to provide narrow outlets 41 for discharge of fluid from the basket. The inner bottom periphery of the basket is secured to the flange of the hub 33 by screws 42. The basket is thus mounted on the hub adjacent its center of mass. Ridges 43 in the bottom of the basket inclined to the radii of the basket with their outer ends advanced in the direction of rotation serve to impart a roll-over motion to the contents during the washing operation. The side wall portion 44 of the basket 17 inclines slightly outward (about four degrees) from its axis, so that fluid will climb the wall during centrifuging and escape through the vents 41. The upper margin of the basket is provided with an inwardly rolled flange 45.

A central shaft 46 concentric with the column 18 and hollow shaft 27 is formed with a spherical head 47 received in a bore 48 in the member 36 and fitted with a transverse pin 49 engaging in slots 51 in the wall of the member 36. A universal joint driving connection is thus provided between the shaft 46 and the hub 33. A driving pulley 52 is fixed on the lower end of the hollow shaft 27 and retains within its hub a ball bearing 53 which supports the lower end of the shaft 46. A drive pulley 54 is fixed to the lower end of the shaft 46.

By selectively driving and braking the shafts 27 and 46 the basket 17 may be given either a wobbling motion for washing or a rotating movement for centrifuging. When the shaft 46 is braked and the hollow shaft 27 is driven, the basket is given a wobbling motion, the axis of the basket following two conical paths, the apices of the cones being at the center of the bearing 32. This motion of the basket, when the shaft 27 is driven at the proper speed, agitates and distributes the clothes and water about the basket 17, and rapidly and thoroughly washes them.

When the shaft 27 is braked and the shaft 46 is rotated, the basket is given a simple rotational movement about the axis of the bearing 32, which motion serves to extract the water from the clothes through centrifugal action, the excess water climbing the lower wall of the basket and escaping through the openings 41 into the tub 15, 16. A drain opening or spout 56 is formed at the bottom of the tub.

The rotation of the basket about its own axis during extracting, which is a feature with respect to which the present application is a continuation-in-part of the aforesaid co-pending application, Serial No. 500,945, filed September 2, 1943, which became abandoned November 27, 1947, permits the machine to be more compactly constructed and arranged, with a more rapid and efficient extracting operation, since less inclination of the wall 44 is required to obtain centrifugal discharge of water around the entire periphery of the basket than is required when the basket rotates about the axis of the hollow shaft 27. In the present construction a small angle of inclination of the wall 44, which may be and preferably is less than angle of inclination of the bearing 32, causes the water to climb the side wall and be discharged around the entire periphery of the basket during extracting, whereas in machines in which the basket spins about the axis of the vertical shaft 27 the inclination of the side wall of the basket must exceed the inclination of the bearing to obtain a similar extracting operation. The present arrangement therefore provides a smaller and more compact machine for a given weight of clothes.

In the preferred embodiment of the machine as disclosed herein, the basket 17 is imperforate below the openings 41, which are arranged at the point of maximum diameter of the basket, well above the level of the clothes and water. In washing, the clothes and the proper amount of water are placed in the basket and the water remains in the basket throughout the washing cycle except for insignificant amounts which may be splashed out. Good results are obtained by the use of water in the proportion of about 1 gallon of water to one pound of clothes, although this proportion may be varied substantially.

The hub is provided with a lid 57 to return any water which may be splashed from the basket. The lid is formed with a depending flange 58 received within the mouth of the tub and against an annulus 59 of rubber-like material. A skirt 61 depends slightly into the mouth of the basket so that any water splashed out of the basket near its periphery will normally strike the skirt and fall into the basket. A central hole 62 in the cover with a rolled margin serves as a finger hole for removing the cover, and a shallow cone 63 spot-welded to the underside of the cover prevents ejection of fluid through the hole 62.

A drive motor 66 is mounted on the base adjacent the tub in any convenient manner, as by feet 67, with its shafts 68 extending through the base. A carrying handle 69 is bolted to the upper end bell of the motor and to the upper section 15 of the tub.

The machine is supported by four feet 71 of novel construction, one of which is shown in section in Fig. 1. The feet include large rubber suction cups to grip a smooth surface such as the bottom of a bathtub to prevent crawling of the machine during operation and at the same time provide a mounting which is flexible both vertically and laterally. Each leg comprises a flanged metal cup 72 secured to the under surface of the base plate 14 by a bolt 73 and a rubber suction cup 74 with a base which extends into the cup 72 with a flange 75 bearing against the flange of the cup 72. The suction cups are of the usual concavo-convex cross section, generally as shown, and are of relatively large size, preferably two inches or more in diameter. The elasticity of the rubber of the cups tends to maintain the lower face concave despite the weight of the machine unless they are pressed against a surface to force air out. A very small bleed hole 76 is formed in each suction cup, a satisfactory way of forming the hole being to drill through with a 1/32 inch drill, making a substantially invisible hole.

The bleed holes make it possible to remove the washing machine from the bathtub or other supporting surface without difficulty, since air bleeds into the space between the cups and the supporting surface. However, the bleed holes, because of the mode of operation of the machine, do not interfere with adhesion of the suction cups during the operation of the machine. The reason for this is that in operation, both in washing and in extracting, any vibrations that tend to move the machine on its supporting surface have vertical components which tend alternately to force the suction feet down and lift them up. When the foot is forced downward by vibration, if it is not firmly seated, air or water will be pumped out around the margin of the cup. When the vibratory movement is upward the tendency is to draw air in through the bleed hole, but since the orifice is so small, air can enter only very slowly relative to the speed at which it can be expelled at the rim of the suction cup. Thus, due to the vibration of the machine, a vacuum is maintained within the cup. When the operation of the machine is ended, however, sufficient air will enter through the bleed hole to destroy the vacuum in the suction cup within a short time and permit the machine to be lifted. The suction cups are formed with an intermediate stem portion 77 to give them lateral and vertical flexibility so that the machine has a limited freedom of movement sufficient to permit it to vibrate with respect to the surface on which it is mounted and thus minimize transmission of vibrations to the supporting surface.

Vibration of the machine during the washing operation is minimized by the provision of rotating weights in static balance and dynamic unbalance which set up a force in opposition to the reaction from the wobbling movement of the container 17. These counterbalancing weights are a weight 81 fixed to the head 31 of the hollow shaft 27 by a screw 82, and a diametrically opposed weight 83 secured to the hollow shaft pulley 52 by a bolt 84. When the hollow shaft 27 is rotated from the position shown in Fig. 1, and the shaft 46 is held stationary, the basket 17 is moved clockwise about an axis perpendicular to the plane of Fig. 1 passing through the center of the ball 47. The force applied through the bearing 32 to produce this motion of the basket reacts on the machine as a whole and tends to move it counterclockwise about the same axis. At the same time, the rotating weights 81 and 83 generate centrifugal forces which are displaced lengthwise of the axis of rotation of the shaft 27. These centrifugal forces constitute a couple which, at the instant the parts are in the position shown in Fig. 1, tends to move the machine in a clockwise direction. By properly proportioning the masses of the weights 81 and 83 their distances from the axis of rotation, and their axial separation, the couple set up by these weights may be made equal and opposite to the couple resulting from the movement of the basket 17. It will be apparent that the couple due to the weights 81 and 83 rotates with the shaft 27 and the reaction force of the basket 17 likewise rotates with the shaft 27 so that these forces remain in opposition to each other during the washing action. Preferably the magnitude of the couple created by the weights 81 and 83 is sufficient to balance substantially the mass of the basket 17 and the reaction force of an average load of clothes and water.

The weights 81 and 83 may be mounted on the hollow shaft 27 because of the fact that this shaft is rotated only during the washing operation and is held stationary during the extracting operation. It will be apparent that the weights would create an erratic operation if they were mounted on a member which rotates during extracting. In respect to this feature of driving the outer shaft during washing and holding it stationary during extracting, the present application is a continuation-in-part of my said application Serial No. 500,945, filed September 2, 1943, which became abandoned November 27, 1947.

It will be recalled that the hollow shaft 27 is rotated and the central shaft 46 is held stationary during the washing operation, and that the shaft 46 is rotated and shaft 27 is held stationary during the extraction operation. These motions are supplied from the single motor 66 by means of a novel drive mechanism which, in addition, provides for braking both the hollow shaft and the central shaft. The novel clutch and brake mechanism is shown geenrally in Figs. 1 and 2 and in greater detail in Figs. 4 to 6. A pulley 86 (Fig. 5) on the motor shaft 68 drives the pulley 52 fixed to the hollow shaft by a belt 87. A second drive pulley 88 on the motor shaft drives the central shaft pulley 54 by a belt 89. The pulleys 86 and 88 are mounted to float on the motor shaft 68, as will be seen most clearly in the sectional view of Fig. 6, and are of identical construction, being formed with a central opening 91 for clearance of the motor shaft and counter bored at 92 to receive a ball bearing 93 which is slidable on the motor shaft. A spring 94 compressed between a boss 96 on the motor frame and the inner bearing race urges the pulley 86 downward. A spring 97, compressed between the inner race of the lower bearing 93 and a washer 98 secured to the lower end of the shaft 68 by a screw 99, urges the lower pulley upward. Each pulley is formed with a flange 101 faced with a ring of friction material 102, the flanges being on the adjacent faces of the two pulleys. A driving clutch disc 103 is fixed to the shaft 68 intermediate the pulleys 86 and 88 by a pin 104. The upper and lower faces of the clutch disc 103 may coact with the clutch facings 102 of the pulleys 86 and 88 to couple either pulley to the motor shaft 68.

The clutching and unclutching as well as braking of the pulleys is accomplished by a non-rotating ring 106 disposed around the clutch disc 103 between the outer portions of the flanges 101 of the pulleys. The ring 106 is supported between two arms 107 of a clutch operating lever 108 by means of pointed cap screws 109 received in conical holes 111 at the opposite ends of a diameter of the ring 106. The ring 106 is of greater thickness parallel to the axis of the shaft 68 than the disc 103. With the ring 106 in the position shown in Figs. 5 and 6, the lower pulley is held out of engagement with the clutch disc 103 and is braked by engagement with the ring 106, the brake engaging force being supplied by the spring 97. If the ring 106 is elevated slightly, it picks up the upper pulley 86, slightly compressing the spring 94, and maintaining both pulleys clear of the driving disc 103. Still further vertical movement of the ring 106 permits the lower pulley 88 to engage the disc 103 and be driven thereby while the pulley 86 is still braked.

Control of the position of the brake and clutch lever 108 is effected by a handwheel 113 (Figs. 1 and 3) fixed to the upper end of a vertical control shaft 114 by a screw 116. The upper end of the shaft 114 is guided by a bracket 117 extending from the handle 69, and the lower end is guided by a bearing 118 (Figs. 1 and 5) secured to the base 14. Indicia 119, 120 and 121 on the knob 113 identify "wash," "off," and "dry" positions of the control shaft, being read against an index 122 fixed to the upper casing 15 of the tub. The lower end portion 123 of the control shaft 114 is threaded and bears thereon in tightly assembled relation, a nut 124, a bushing 125 within, and slightly longer than, the bearing 118, a thrust nut 126, a lock nut 127, a threaded member 128, and two lock nuts 129.

The member 128 is formed with threads of large pitch on its outer surface. A nut 131, which may be of octagonal form, travels on the screw 128. The nut 131 is formed with slots 132 in opposite faces, in which are engaged the edges of a slot 133 in the clutch operating lever 108. An enlarged portion 134 of the slot provides for assembly of the nut 132 into the slot 133. An arm 136 of the lever 108 is pivoted by a pin 137 in a clevis of a bracket 138 which is fixed to the under side of the base plate 14. Rotation of the shaft 114 by the knob 113 raises and lowers the nut 131 through action of the screw 128, rotating the lever 108 about its fulcrum 137. The brake ring 106 is thus moved axially of the motor shaft 68, as previously described. The position of the ring 106 in Figs. 5 and 6, in which the upper pulley 86 is rotated, is the "wash" position, causing rotation of the hollow shaft 27. When the handwheel 113 is turned 90 degrees to the "off" position both pulleys are braked and the motor runs idle. When the knob is turned further to the "dry" position the pulley 86 is braked and the pulley 88 is rotated to effect the centrifuging action.

Figs. 7 to 12 illustrate the incorporation, in the machine just described, of means to decelerate the basket upon the occurrence of excessive vibration during the extracting operation. In general, this is accomplished by substituting, for the fixed pin 137 of Fig. 5, a movable fulcrum for the clutch lever 108, and providing mechanism to move the fulcrum so as to declutch and brake the pulley 88. Apart from this feature the machine may be the same as previously described. Certain parts which are unmodified are identified in Figs. 7 to 12 by the same reference characters as in Figs. 1 to 6 for purposes of identification.

Fig. 8 illustrates the mechanism in the normal position for extraction with the ring 106 braking the pulley 86 and permitting the pulley 88 to engage the driving clutch disc 103. The clutch lever 108a is formed to coact with the brake ring 106 and the traveling nut 131 in the manner previously disclosed, but the fulcrum end is bifurcated as shown in Figs. 7 and 11, the fulcrum pin 137a passing through the legs 151 and 152 of the lever and being retained in place by cotter keys or the like 153. The pin 137a passes through the outer end of the arm 154 of a bellcrank lever which is disposed between the legs 151 and 152 of the clutch lever. The second arm 155 of the bellcrank is in the form of a depending pin at right angles to the leg 154. The bellcrank lever is fulcrumed on a pivot pin 156 (Figs. 7 and 12) which is mounted in a U-shaped bracket 157 formed with flanges which are secured to the under surface of the base plate 14 by machine screws 158. The lower portion of the bracket 157 is cut away at 159 for clearance of the arm 155 of the bellcrank. The arm 154 of the bellcrank lies within and extends beyond the vertical portions of the bracket 157. An extension 161 of the lower portion of the bracket underlies the end of the arm 154 which normally rests thereon. A coiled compression spring 162 disposed between the bellcrank arm 154 and the base plate 14 urges the outer end of the arm downwardly. The lower end of the spring is received in a blind bore 163 in the end of the arm and the upper end is inserted in a blind bore 164 in the base plate 14.

The force of the spring 162 is greater than that of the spring 94 so that normally the bellcrank arm 154 is held against the projection 161 of the bracket 157 when the arm 108a is raised, and the action of the clutch and brake mechanism is the same as previously disclosed. However, if the arm 155 is forced to the right from the position of Fig. 8 to that of Fig. 10, the pin 137a will be raised and the lever 108a will be rotated about the nut 131 as a fulcrum. This lowers the braking ring 106 against the clutch facing 102 of the lower pulley 88, braking and declutching the pulley and decelerating the basket.

This actuation of the arm 155 is effected by a vibration-control plate 166 parallel to the base plate 14 and supported by modified suction cups 74a adjacent the bottom of the legs 71. The suction cups 74a are formed with ears 167 extending horizontally therefrom near the lower surface, which are pierced for machine screws 168 received in tapped holes in slightly dished portions 169 at the margin of the plate 166. The plate 166 is formed for clearance from the feet 71 except where it engages the ears 167.

The arm 155 extends through an opening 171 in the plate 166 which is partially closed by a plate 172 adjustably mounted on the plate 171 by bolts 173 which pass through slots 174 in the plate 171. The plate 172 is formed with a central opening 176 in which is fitted a rubber grommet 177. When the machine is not operating the grommet 177 is slightly out of contact with the left hand side of the arm 155 as shown in Fig. 8. If extraction is started and the material in the basket is unbalanced, as the centrifuge gains speed, the entire machine will vibrate laterally as a result of the centrifugal forces and the resilience of the stems of the suction cups. The body of the machine including the plate 14 will vibrate with respect to the control plate 166 which will remain substantially stationary, since it is mounted near the bottoms of the suction cups. If the vibration is excessive, the grommet 177 will engage the arm 155 and hammer against it rapidly, rotating the bellcrank as in Fig. 10, and releasing the clutch so as to reduce the speed of rotation. The sensitiveness of the vibration control may be varied by shifting the plate 172 to the right or left in Figs. 8 and 10.

Preferably the shaft 27 is driven during washing at a speed such that the bottom surface of the container 17 is accelerated upwardly and downwardly at accelerations exceeding the acceleration of gravity. For this purpose the shaft 27 may be driven at a speed of about 600 R. P. M. in the embodiment illustrated, in which the bearing 32 is inclined at about seven degrees and the container 17 has a diameter of about twelve inches. The resulting rapid wobbling motion imparted to the container gives a jigging motion to the clothes and water with a relatively slow progression of the mass of clothes and water about the container and a roll-over motion, with the outer portions of the mass of clothes and water rising along the side wall 44 and moving inwardly over the top and the mass and downwardly around the central member 33.

The shaft 46 may be, and preferably is, rotated for extracting at the same speed that the shaft 27 is rotated for washing. It will be apparent, however, that the relative speeds of the two shafts may be modified as desired by changing the sizes of the driving pulleys.

To operate the machine it may be set in a bathtub, sink, wash tub, or the like. Preferably the supporting surface is one on which water may be permitted to drain from the outlet 56. An appropriate quantity of water, in the proportion of about one gallon of water to one pound of clothes, is poured into the container 17 and soap or a detergent is added. The clothes to be washed are dumped into the container, the motor is energized, and the control knob is turned to the "wash" position. The container is thus wobbled, agitating the clothes and water, the clothes being given a rapid jigging motion and also a relatively slow rotation around the container and a roll-over motion, as described in my aforementioned copending applications. When the clothes have been washed a sufficient time, the control may be turned to "dry," spinning the container about its axis and expelling the wash water, soap and dirt by centrifugal force. Clean water is then added, and the washing and extracting cycles are repeated to rinse the clothes and extract the rinse water. A second rinse may be performed if desired. It will be noted that when the control is turned to "off," the rotation of the basket is braked so that it soon comes to a stop, permitting convenient removal of the clothes. Water expelled from the container is caught by the tub 16, 17 and drained into the sink or bathtub from the outlet 56.

Vibration of the machine during the washing operation is minimized by the balancing weights 81, 83 and any residual vibration is exhibited as free vibration of the entire machine, which is permitted by the vertical and lateral resilience of the rubber feet. Excessive vibration of the machine during the extracting operation is prevented by the vibration-sensitive speed control for the extractor illustrated in Figs. 7 to 12. Crawling of the machine is prevented by the adhesion of the suction cups to the surface of the tub. Upon completion of the washing operation, air enters the suction feet through the bleed holes 76 and the machine may be readily removed and stowed away.

Many modifications of the machine disclosed herein may be made within the compass of the invention, and certain features may be employed without the employment of others. For example, a flexible shaft may be substituted for the central shaft 46 and its universal joint, as in my aforementioned application Serial No. 500,945, filed September 2, 1943, which became abandoned November 27, 1947.

Separate motors may be employed to drive the shafts 27 and 46 alternately or concurrently, in general as disclosed in said abandoned application Serial No. 500,945. Such modification need not eliminate the vibration control during extraction. The pulley 86 may be removed without affecting the extractor drive, and may be driven by a second motor.

In such case, the operation of the shafts 27 and 46 may be controlled by selectively or concurrently energizing the two motors, or by providing a clutch between each motor and its shafts. Brakes for the shafts may be provided, which may, for example, be combined with a clutch as in the form specifically disclosed herein, or may be separate from the clutch, as in said abandoned application Serial No. 500,945.

What is claimed is:

1. In combination, a machine including a mechanism the operation of which is normally accompanied by vibration, laterally flexible legs for supporting the machine, a member connected to the legs adjacent the lower ends thereof so as to shift laterally to a smaller extent than the machine due to vibration, means on the machine adapted to retard the mechanism, and an operator for the said means adapted to engage the member upon excessive vibration of the machine and be displaced by the member to retard the mechanism.

2. In combination, a machine including a mechanism the operation of which is normally accompanied by vibration, a motor for driving the mechanism, a clutch interposed between the motor and the mechanism, a brake for the mechanism, laterally flexible legs for supporting the machine, a member connected to the legs adjacent the lower ends thereof so as to shift laterally to a smaller extent than the machine due to vibration, means on the machine adapted to release the clutch and engage the brake, and an operator for the said means adapted to engage the member upon excessive vibration of the machine and be displaced by the member to release the clutch and engage the brake.

3. In combination, a machine including a mechanism the operation of which is normally accompanied by vibration, a motor for driving the mechanism, a clutch interposed between the motor and the mechanism, laterally flexible legs for supporting the machine, a member connected to the legs adjacent the lower ends thereof so as to shift laterally to a smaller extent than the machine due to vibration, means on the machine adapted to release the clutch, and an operator for the said means adapted to engage the member upon excessive vibration of the machine and be displaced by the member to release the clutch.

4. In combination, a machine including a mechanism the operation of which is normally accompanied by vibration, a motor for driving the mechanism, a brake for the mechanism, laterally flexible legs for supporting the machine, a member connected to the legs adjacent the lower ends thereof so as to shift laterally to a smaller extent than the machine due to vibration, means on the machine adapted to engage the brake, and an operator for the said means adapted to engage the member upon excessive vibration of the machine and be displaced by the member to engage the brake.

5. A washing and extracting machine comprising a frame, a vertically disposed pedestal carried by the frame, a motor carried by the frame, a tube rotatably carried in said pedestal, a shaft within said tube, a washing and extracting container connected to the upper end of said shaft, a base assembly supporting said frame for limited lateral movement in response to gyratory movements of the said container and pedestal, said base assembly including a plate having an aperture beneath said frame, drive means operatively connecting said motor and the lower end of said shaft, said drive means including a friction clutch, a control for said clutch on the frame having a depending pin loosely fitting in said aperture whereby gyratory movement of the frame with respect to the base assembly moves said clutch control to effect release of the clutch proportional to the movement.

References Cited in the file of this patent
UNITED STATES PATENTS

| | | |
|---|---|---|
| 1,600,249 | Sando | Sept. 21, 1926 |
| 1,946,725 | Andrews et al. | Feb. 13, 1934 |
| 2,035,481 | Hume | Mar. 31, 1936 |
| 2,067,572 | Kirby | Jan. 12, 1937 |
| 2,119,918 | Kirby | June 7, 1938 |
| 2,161,604 | Watts | June 6, 1939 |
| 2,645,917 | Kirby | July 21, 1953 |